United States Patent [19]

Niskanen

[11] Patent Number: 5,556,224
[45] Date of Patent: Sep. 17, 1996

[54] SHIFTER HANDLE ASSEMBLY

[75] Inventor: Don L. Niskanen, Spring Lake, Mich.

[73] Assignee: Grand Haven Stamped Products, Grand Haven, Mich.

[21] Appl. No.: 388,243

[22] Filed: Feb. 14, 1994

[51] Int. Cl.$^6$ .............................. B25G 3/00; F16B 7/10; F16D 1/00; C21B 11/00
[52] U.S. Cl. ..................... 403/379; 403/324; 403/372; 403/377; 74/477; 74/524
[58] Field of Search ................................. 403/224, 225, 403/315, 316, 317, 138, 319, 355, 365, 367, 376, 377, 378, 329, 380; 74/471, 473, 476, 477, 491, 524, 523

[56] References Cited

U.S. PATENT DOCUMENTS

| | | |
|---|---|---|
| 1,091,212 | 3/1914 | Gregory . |
| 1,156,272 | 10/1915 | Cass . |
| 1,887,640 | 11/1932 | Hickman . |
| 2,013,962 | 9/1935 | Hutchens . |
| 3,401,574 | 9/1968 | Doolittle . |
| 3,561,281 | 2/1971 | Wilfert . |
| 3,657,943 | 4/1972 | Bruhn, Jr. et al. . |
| 3,899,934 | 8/1975 | Froumajou . |
| 3,998,110 | 12/1976 | O'Brien et al. . |
| 4,106,311 | 8/1978 | Euler .................................... 403/377 X |
| 4,207,794 | 6/1980 | Collister ............................. 403/317 X |
| 4,492,129 | 1/1985 | Hasegawa . |
| 4,505,058 | 3/1985 | Peterson ............................. 403/324 X |
| 4,598,606 | 7/1986 | Foggini . |
| 4,603,598 | 8/1986 | Tsuji et al. ............................ 74/473 P |
| 4,862,760 | 9/1989 | Kuwahara et al. . |
| 5,189,925 | 3/1993 | Neal et al. . |
| 5,313,853 | 5/1994 | Olmsted et al. . |

*Primary Examiner*—Kenneth J. Dorner
*Assistant Examiner*—Bruce A. Lev
*Attorney, Agent, or Firm*—Price, Heneveld, Cooper, DeWitt & Litton

[57] ABSTRACT

A shifter handle assembly for an automotive transmission. The shifter handle assembly comprises a shifter handle having a bore into which the shifter of a vehicle is inserted. A retaining clip is inserted within an aperture of the shifter handle which engages a recessed groove in the shifter such that separation of the shifter handle assembly is prevented. The assembly is preferably constructed of four parts, all held together by the retaining clip.

18 Claims, 2 Drawing Sheets

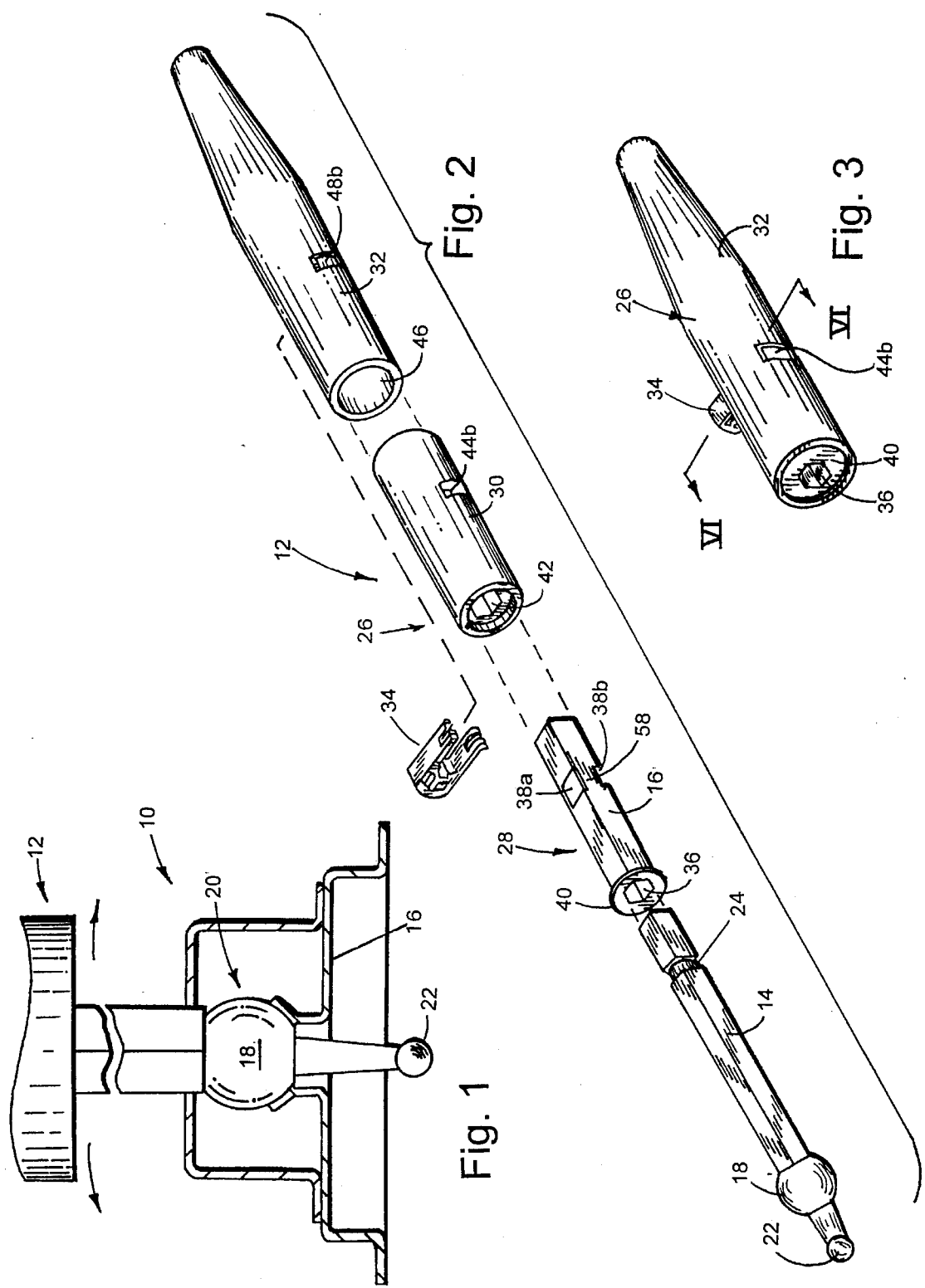

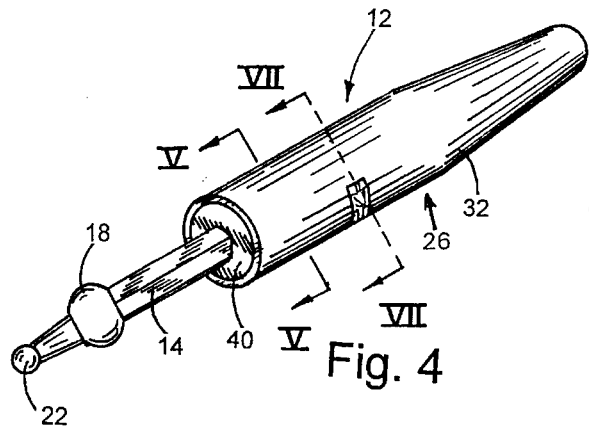
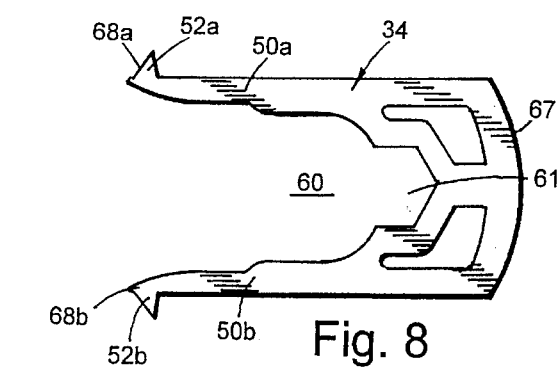
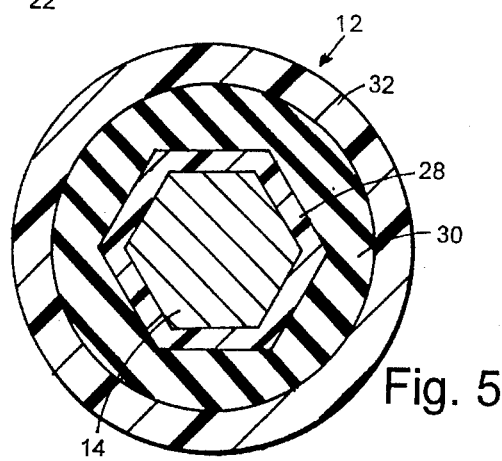
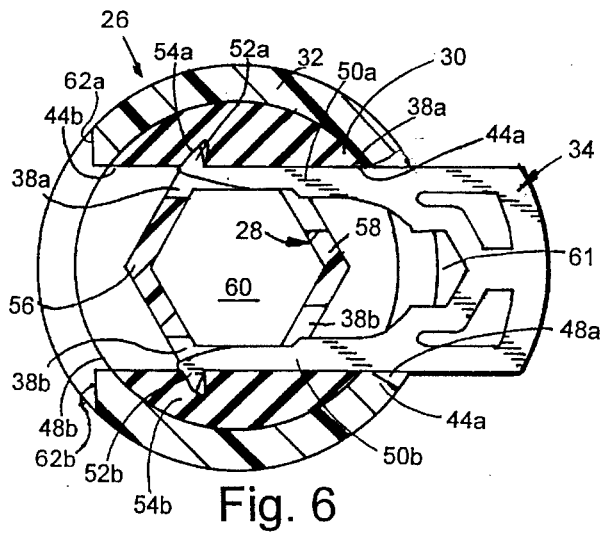
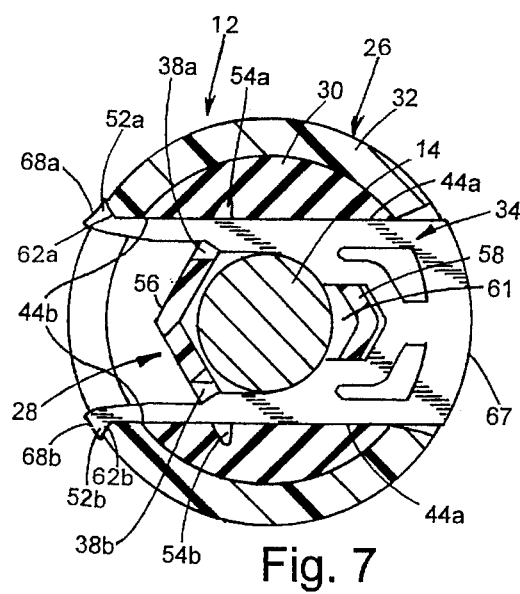

SHIFTER HANDLE ASSEMBLY

BACKGROUND OF THE INVENTION

This invention relates to a shifter handle assembly attachable to the shifting mechanism of automotive transmissions.

Shifter handles which are adapted for attachment to a shifter that has already been installed in a vehicle are well known in the prior art. Some of these shifter handles have multi-component structures in which one component may consist of shock-absorbing insulation to protect the driver's hand from mechanical vibrations emanating from a vehicle.

Various means exist by which to connect a shifter handle to the shifter in a vehicle. For example, it is known to provide inner threads within a shifter handle that match outer threads on the top portion of the shifter such that the two structures can be screwed together. However, connection in this manner is very time consuming, and the screwing motion requires proper indexing of the shifter handle indicator. This indicator is located on the very top of the shifter handle and indicates the shifter movements necessary to shift a vehicle into different gears. Another known method of connection is to bolt the shifter handle onto the shifter. Although this method eliminates the above-mentioned indexing problem, the bolting process likewise makes connection very time consuming and requires considerable room for attachment tools.

Analysis of this prior art reveals the absence of a quick and easy means by which to connect a shifter handle to a shifter. In particular, the prior art does not disclose a quick and easy means of connection of a shifter handle having a multi-component structure in which one component may consist of shock-absorbing insulation.

SUMMARY OF THE INVENTION

These and other problems in the prior art are solved through the shifter handle assembly of the present invention.

The shifter handle assembly of the present invention comprises a shifter handle having a bore into which the shifter of a vehicle is inserted. A retaining clip is inserted within an aperture of the shifter handle which engages a recessed groove in the shifter lever such that separation of the shifter handle assembly is prevented.

In a preferred embodiment of the present invention, the shifter handle assembly comprises four telescoping parts comprising a shifter lever, a base part, a shock-absorbing part, and an outer handle part. The three latter parts are held together and secured to the shifter lever by a retaining clip.

The shifter handle assembly of the present invention provides a quick and easy means by which to connect a shifter handle to a shifter. In particular, it provides a quick and easy means of connection of a shifter handle having a multi-component structure in which one component may consist of shock-absorbing insulation.

BRIEF DESCRIPTION OF THE DRAWINGS

FIG. 1 is a side-elevational, partial view of a shifter pivotally mounted within a base and including a portion of the shifter handle assembly of the present invention;

FIG. 2 is an exploded view of the shifter handle assembly of the present invention;

FIG. 3 is a perspective view of the shifter handle assembly of the present invention without the shifter lever and with the retaining clip in a position for shipment;

FIG. 4 is a perspective view of the shifter handle assembly;

FIG. 5 is a cross-sectional view of the shifter handle assembly taken along the plane V—V of FIG. 4;

FIG. 6 is a cross-sectional view of the assembled shifter handle subassembly taken along the plane VI—VI of FIG. 3;

FIG. 7 is a cross-sectional view of the shifter handle assembly taken along the plane VII—VII of FIG. 4; and FIG. 8 is a plan view of the retaining clip which is a component of the shifter handle assembly.

DESCRIPTION OF THE PREFERRED EMBODIMENTS

Now referring to FIG. 1, a shifter 10 is shown having a handle assembly 12 including a shifter lever 14, typically formed of metal. Lever 14 extends upwardly and is pivotally mounted within a base 16 by a pivoting means such as a ball 18 within a ball and socket joint 20. This mounting enables the shifter lever to pivot as indicated by the arrows. Shifter lever 14 has a ball 22 located at one end that is operatively connected to the automotive transmission (not shown). This ball actuates the shifting mechanism and changes the drive ratio of the transmission when shifter lever 14 is pivoted. It should be understood that shifter 10 is disclosed only as an example of a shifter on which the handle assembly 12 is mounted, and that handle assembly 12 can be mounted on any number of differently constructed shifters that are installed in a vehicle and have an upwardly extending lever, such as lever 14, on which a shifter handle is later mounted.

FIG. 2 is an exploded view of a preferred embodiment of the shifter assembly of the present invention. Shifter lever 14 is shown having a hexagonal shape with a recessed groove 24 extending laterally around its circumference. A shifter handle subassembly 26 is shown comprising a base part 28, a shock-absorbing part 30, and an outer handle part 32. A retaining clip 34 is shown which is used to hold the handle subassembly together and to secure it to shifter lever 14.

Base part 28 of FIG. 2 is constructed of a rigid plastic material and has a hexagonal outer shape. A bore 36 is located at one end having a hexagonal shape that matches the outer shape of shifter lever 14, thus enabling the shifter lever to be snugly inserted therein without any possibility of turning. Apertures 38a and 38b are provided on opposite sides of the walls of the base part, and a lip 40 is preferably formed near the opening of bore 36, for reasons discussed below. Apertures 38a and 38b define a wall portion 56 and wall portion 58, which is narrower than wall portion 56 for the reason which will become apparent hereinafter.

Shock-absorbing part 30 of FIG. 2 is constructed of rubber or thermoplastic rubber and is preferably insert molded in the outer handle part 32, thus bonding part 30 to prevent movement between parts 30 and 32. It has a bore 42 located at one end having a hexagonal shape that matches the outer shape of base part 28. These matching shapes enable the base part 28 to be inserted within bore 42 without any possibility of turning. In addition, apertures 44a and 44b are provided on opposite sides of the walls of shock-absorbing part 30. Between these two apertures, recesses or indentations 54a and 54b are provided for retaining clip 34 as will be described hereinafter.

Outer handle part 32 of FIG. 2 is constructed of a plastic material and has a bore 46 located at one end having a shape that matches the outer shape of the shock-absorbing part, thus enabling the latter part to be inserted within bore 46. Apertures 48a and 48b are provided on opposite sides of the outer handle part and are preferably of the same size and shape as apertures 44a and 44b of the shock-absorbing part 30. Further, aperture 48b includes ledges 62a and 62b also provided to retain clip 34 in the apertures.

Retaining clip 34 is constructed of a resilient metal and is of a size and configuration to fit within apertures 38a, 38b, 44a, 44b, 48a, and 48b of the base part, the shock-absorbing part, and the outer handle part, respectively. In addition, retaining clip 34 has arms 50a and 50b that fit within recessed groove 24 of shifter lever 14 upon assembly of the shifter handle assembly. The ends of arms 50a and 50b include detents 52a and 52b, respectively. The space between arms 50a and 50b is configured to provide the widened portion 60 and narrowed portion or cavity 61.

In order to facilitate the attachment of the shifter handle assembly to the shifter lever of a vehicle, the four parts of subassembly 26 are assembled prior to shipment, as shown in FIG. 3. Assembly consists of the insertion of the shock-absorbing part 30 within bore 46 of outer handle part 32 and the insertion of the base part 28 within bore 42 of shock-absorbing part 30. Thus, the three parts of the shifter handle subassembly are connected together in a telescoping fashion. Upon assembly, the apertures 38a, 38b, 44a, 44b, 48a, and 48b of all three parts are aligned such that retaining clip 34 can be partially inserted therein to prevent separation of the parts during shipment. In a preferred embodiment, the shock-absorbing part 30 and the outer handle part 46 abut lip 40. Lip 40 is provided to reduce deflection of the system. Outer handle 32 "floats" on rubber 30 relative to inner base 28 with normal shift loads. When higher loads are applied, lip 40 contacts the wall of aperture 46, thus reducing isolation but preventing high deflection.

The details of the positioning of retaining clip 34 ready for shipment will now be described. FIG. 6 is a cross-sectional view of the assembled shifter handle subassembly taken along the plane VI—VI of FIG. 3. Retaining clip 34, a plan view of which is shown in FIG. 8, is shown partially inserted within the aligned apertures of the three subassembly parts which prevents separation of the subassembly during shipment. In this position, detents 52a and 52b (FIG. 8) on each end of arms 50a and 50b of clip 34 fit within indentations 54a and 54b, respectively, provided on the interior surface of shock-absorbing part 30. During shipment, detents 52a and 52b prevent the dislodging of retaining clip 34 out of the shifter subassembly and provide some resiliency against full insertion of the clip. Arms 50a and 50b of retaining clip 34 are configured such that when partially inserted they will not interfere with the subsequent insertion of shifter lever 14 within bore 36 of base part 28. It should be noted that the cross-sectional view of base part 28 shows wall portions 56 and 58, the importance of which will now be described below.

After shipment, the assembled shifter handle subassembly is attached to the shifter lever 14 of a vehicle, as shown in FIG. 4. Attachment consists of the insertion of shifter lever 14 within bore 36 of the base part until recessed groove 24 aligns with apertures 38a, 38b, 44a, 44b, 48a, and 48b. FIG. 5 is a cross-sectional view taken along the plane V—V of FIG. 4 showing the resulting telescoped layers of outer handle part 32, shock-absorbing part 30, base part 28, and shifter lever 14. Following insertion of shifter lever 14, retaining clip 34 is fully inserted within the apertures of the assembled parts such that arms 50a and 50b (FIG. 2) engage recessed groove 24 to prevent separation of the shifter handle assembly.

FIG. 7 is a cross-sectional view of the assembled shifter handle assembly 12 taken along the plane VII—VII of FIG. 4 and shows the positioning of the retaining clip 34 therein. Retaining clip 34 is shown fully inserted within the aligned apertures of the subassembly parts. The shortened wall portion 58 of the base part enables the widened space 60 (FIG. 8) between arms 50a and 50b to receive recessed groove 24 of shifter lever 14 and arms 50a and 50b to engage the walls of the groove 24. Detents 52a and 52b of retaining clip 34 spring outwardly and engage ledges 62a and 62b formed on the outer handle part. These detents operate to lock the retaining clip 34 into place such that separation of the shifter handle assembly is prevented. In order to further stabilize the positioning of the retaining clip, the narrowed space or cavity 61 is provided in the retaining clip to receive and engage the narrowed wall portion 58 of the base part, as shown in FIG. 7. In a preferred embodiment of the present invention, retaining clip 34 has end surface 67 and legs 50 have end surfaces 68a and 68b (FIG. 8) that is curved in shape such that they are flush with the outer surface of the outer handle part, as shown in FIG. 7.

OPERATION

In operation, the telescoped base part 28, shock-absorbing part 30, and outer handle part 32 of the shifter handle subassembly 26 are connected, prior to shipment, by means of partial insertion of retaining clip 34 within aligned apertures 38a, 38b, 44a, 44b, and 48a. As clip 34 is inserted through apertures 48a, 44a, 38a, and 39a, arms 50a and 50b are flexed inwardly and the walls of part 30 are slightly temporarily deformed because of detents 52a and 52b. When detents 52a and 52b reach indentations 54a and 54b, the resiliency of legs causes the detents to snail into indentations 54a and 54b which holds clip 34 in the apertures which in turn holds all the parts 32, 30, and 28 together during shipment. After shipment and when connection is to be made with the shifter of a vehicle, assembled subassembly 26 is placed over shifter lever 14 until apertures 38a, 38b, 44a, 44b, 48a, and 48b are aligned with groove 24. Retaining clip 34 is then forced inwardly until it is fully inserted with legs 50a and 50b in groove 24 and locked into place by detents 52a and 52b engaging ledges 62a and 62b, respectively, such that separation of the shifter handle assembly 12 is prevented. The clip 34 is held in this position by the arms 50a and 50b being biased outwardly to force detents 52a and 52b to engage ledges 62a and 62b, respectively. In this position of clip 34, all the parts are held together and secured to lever 14.

The shifter handle assembly of the present invention provides a quick and easy means by which to connect a shifter handle to the shifter of a vehicle. In particular, it provides a quick and easy means of connecting a shifter handle having a multi-component structure in which one component may consist of shock-absorbing insulation.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A shifter handle subassembly for attachment to a shifting lever of a shifting mechanism of a vehicle, said lever being an elongated rod having a non-circular cross section and a recessed area extending laterally around at least a portion of the circumference of said lever;

a shifter handle comprised of a plurality of handle components including an outer handle component, an intermediate absorption handle component and an inner handle component each having longitudinally extended bores and connected together in a telescoping fashion, said inner handle component having its bore insertable over said shifter lever, said outer handle component, intermediate absorption handle component, and inner handle component each having at least one aperture extending laterally into each of their said bores and and adapted to be aligned with said recessed area of said lever when said handle is inserted on said shifting lever; and a retaining clip inserted partially into some of said apertures, said retaining clip having arms aligned with said recessed area whereby when said clip is inserted entirely within all of said apertures, said arms will be positioned in the recessed area of said shifter lever to thereby lock said shift handle on said shifter lever.

2. The shifter handle assembly of claim 1 wherein said arms of said retaining clip have curved ends to lock said clip in said other outer aperture and recessed area.

3. The shifter handle assembly of claim 1 wherein the outer surface of said shifter lever and the inner surface of said bore have matching non-circular cross sections.

4. The shifter handle assembly of claim 3 in which the outer surface of said shifter lever and inner surface of said bore have hexagonal cross sections.

5. The shifter handle assembly of claim 1 in which the recessed area extends around the entire circumference of said lever.

6. The shifter handle subassembly or claim 1 wherein said intermediate handle component has at least one recess and at least one of said arms has an enlarged end forming a detent received in said recess for holding said clip partially within said apertures.

7. The shifter handle subassembly of claim 1 in which the outer handle component includes outer apertures in opposite sides thereof and said arms in the partially inserted position of said clip extend through only one of said outer apertures and in such position does not extend into said recessed area, said other outer aperture being located and adapted to receive said arms in a position wherein said arms are received within the recessed area of said shifting lever.

8. A shifter assembly attachable to the shifting mechanism of a vehicle, comprising:

a first handle component having a first bore, said first handle component having first apertures on opposite sides thereof that extend into said first bore;

a second handle component having a second bore, said second handle component having second apertures on opposite sides thereof that extend into said second bore;

a third handle component having a third bore, said third handle component having third apertures on opposite sides thereof that extend into said third bore;

a shifter handle formed by insertion of said second component within said first bore and insertion of said third component within said second bore;

a shifter lever having a recessed area extending laterally around at least a portion of its circumference, said shifter handle being connected to said shifter lever by means of insertion within said recessed area; and a retaining clip inserted within said first, second, and third apertures, said retaining clip having arms that engage said recessed area of said shifter lever to prevent separation of said shifter lever and said shifter handle.

9. The shifter assembly of claim 8 wherein said third handle component further comprises a lip against which the second handle component abuts.

10. The shifter assembly of claim 9 wherein said arms of said retaining clip have enlarged ends forming a detent received in an indentation in the walls of one of the second apertures of said second component to hold said clip in a partial inserted position.

11. The shifter assembly of claim 10 wherein said arms of said retaining clip have outwardly-curved ends.

12. The shifter assembly of claim 10 wherein the outer surface of said third handle component and the inner surface of said second bore have matching non-circular cross sections.

13. The shifter assembly of claim 8 wherein the outer surface of said shifter lever and the inner surface of said third bore have matching non-circular cross sections.

14. The shifter assembly of claim 8 wherein the outer surface of said second handle component and the inner surface of said first bore have matching non-circular cross sections.

15. The shifter assembly of claim 8 wherein said second handle component is formed of a shock absorbing material.

16. The shifter assembly of claim 8 in which the first apertures of the first handle component includes outer openings in opposite sides thereof: said arms in the partially inserted position of said clip extend through only one of said openings and in such position does not extend into said recessed area, said other opening being located and adapted to receive said arms in a position wherein said arms are located within the recessed area of said shifter lever.

17. The shifter assembly of claim 8 in which the first apertures of first handle component includes outer openings in opposite sides thereof with ledges at said openings and said arms of said clip engaging said ledges to hold said clip in said first, second, and third apertures.

18. The shifter handle subassembly of claim 17 in which said arms have first portions spaced apart a first distance whereby in the partially inserted position, the arms do not extend into said recessed area; said arms having second portions spaced a second distance less than said first distance; said third apertures of said third component defining first wall portions received between said first portions of said arms and second wall portions received snugly between said second wall portions when said clip is fully inserted into said first, second, and third apertures.

* * * * *